(12) United States Patent
Zhang et al.

(10) Patent No.: US 12,330,109 B2
(45) Date of Patent: Jun. 17, 2025

(54) HYDROGEN PRODUCTION DEVICE, GAS-LIQUID SEPARATION APPARATUS THEREOF, AND ELECTROLYTE AND HYDROGEN SEPARATING METHOD

(71) Applicant: SHANGHAI LIFENGAS CO., LTD, Shanghai (CN)

(72) Inventors: Zhengxiong Zhang, Shanghai (CN); Yao Ye, Shanghai (CN)

(73) Assignee: SHANGHAI LIFENGAS CO., LTD, Shanghai (CN)

( * ) Notice: Subject to any disclaimer, the term of this patent is extended or adjusted under 35 U.S.C. 154(b) by 0 days.

(21) Appl. No.: 18/764,253

(22) Filed: Jul. 4, 2024

(65) Prior Publication Data

US 2025/0001347 A1  Jan. 2, 2025

Related U.S. Application Data

(63) Continuation of application No. PCT/CN2024/093168, filed on May 14, 2024.

(30) Foreign Application Priority Data

Jun. 27, 2023  (CN) .......................... 202310759858.5
Jun. 27, 2023  (CN) .......................... 202310760819.7

(51) Int. Cl.
*B01D 47/02*       (2006.01)
*B01D 45/08*       (2006.01)
(Continued)

(52) U.S. Cl.
CPC ............. *B01D 47/02* (2013.01); *B01D 45/08* (2013.01); *B01D 53/002* (2013.01); *C01B 3/506* (2013.01);
(Continued)

(58) Field of Classification Search
CPC ...... B01D 45/08; B01D 47/02; B01D 53/002; C01B 3/506; C01B 3/52; C25B 1/04; C25B 15/08

See application file for complete search history.

(56) References Cited

U.S. PATENT DOCUMENTS 7,842,114 B2 *  11/2010  Xu .......................... B01D 45/06
                                                                    55/440
9,248,392 B2 *  2/2016  Brown ................. B01D 46/003

FOREIGN PATENT DOCUMENTS

| CN | 112755594 A |   | 5/2021 |            |
|----|-------------|---|--------|------------|
| CN | 115161706 A | * | 10/2022 | ............... C25B 1/04 |
| CN | 115181997 A | * | 10/2022 | ............... C25B 1/04 |

OTHER PUBLICATIONS

Espacenet Machine Translation of CN 115161706 Obtained Dec. 16, 2024. (Year: 2024).*

(Continued)

*Primary Examiner* — Jonathan Miller
(74) *Attorney, Agent, or Firm* — Ying-Ting Chen

(57) ABSTRACT

A gas-liquid separation apparatus includes a tank and a flow reducing component. An inlet is formed in a middle of the tank. A hydrogen outlet is formed in a top of the tank. A processing chamber connected to the inlet. The flow reducing component is formed in the processing chamber and maintained above the inlet. The flow reducing component forms a flow reducing space and a flow partition chamber in a part of the processing chamber above the inlet, a gas-liquid initial separation space in the processing chamber and below the flow reducing component, at least one connection hole and a connection channel. The flow partition chamber is connected to the flow reducing space through the at least one connection hole. The gas-liquid initial separation space is connected to the flow partition chamber through the con- (Continued)

nection channel. The flow reducing space is arranged to be connected to the hydrogen outlet.

8 Claims, 13 Drawing Sheets

(51) Int. Cl.
*B01D 53/00* (2006.01)
*C01B 3/50* (2006.01)
*C01B 3/52* (2006.01)
*C25B 1/04* (2021.01)
*C25B 15/08* (2006.01)

(52) U.S. Cl.
CPC .................. *C01B 3/52* (2013.01); *C25B 1/04* (2013.01); *C25B 15/08* (2013.01); *C01B 2203/0415* (2013.01); *C01B 2203/046* (2013.01)

(56) References Cited

OTHER PUBLICATIONS

Espacenet Machine Translation of CN 115181997 Obtained Dec. 16, 2024. (Year: 2024).*

* cited by examiner

HYDROGEN PRODUCTION DEVICE, GAS-LIQUID SEPARATION APPARATUS THEREOF, AND ELECTROLYTE AND HYDROGEN SEPARATING METHOD

CROSS REFERENCE OF RELATED APPLICATION

This application is a Continuation Application of the International Application PCT/CN2024/093168, filed on May 14, 2024, which claims priority of the Chinese Patent Application No. CN 202310760819.7, filed on Jun. 27, 2023 and No. CN 202310759858.5, filed on Jun. 27, 2023, the contents of which are incorporated herein by reference in their entirety.

FIELD OF TECHNOLOGY

The present invention relates to the field of hydrogen production devices, and in particular, to a hydrogen production device, a gas-liquid separation apparatus thereof, and an electrolyte and hydrogen separating method.

BACKGROUND

Currently, hydrogen, as a clean chemical gas, is widely applied in various fields. At present, most hydrogen production devices use electrolysis of an electrolyte to produce hydrogen. During the electrolysis process of the electrolyte, hydrogen is produced, and the flow of the electrolyte along with the hydrogen poses significant challenges to the purification of hydrogen.

In the prior art, after the electrolysis of the electrolyte, a mixed fluid is separated by means of a common gas-liquid separator. However, there are still many mist-like electrolytes in the separated fluid, and these mist-like electrolytes will flow along with the hydrogen, especially in alkaline electrolytic water hydrogen production devices. Therefore, the fluid separated by the gas-liquid separator must further be washed by a scrubber to remove a small amount of electrolyte in the fluid, or cooled by a cooler to retain the electrolyte in the fluid.

For example, the Chinese invention patent with the publication patent number of CN112755594A has disclosed "GAS-LIQUID SEPARATOR", which strengthens the gas-liquid separation effect by setting functional components in a chamber of the gas-liquid separator, including a swirl defoaming apparatus, a demisting separation apparatus, a defoaming paddle, a foam buffer chamber, etc. The gas-liquid separator is more effective in removing foam from the gas-liquid mixed electrolyte, but more droplets will be released when the foam bursts. Since in the hydrogen production device, the fluid flowing through the gas-liquid separator has a certain flow rate, these electrolytes in the droplet state will flow away with the gas. Therefore, in order to obtain high-purity hydrogen, the fluid must continue to be separated. In other words, the gas-liquid separators in the prior art cannot obtain high-purity hydrogen by means of a single device. If multiple devices are used to combine multiple processes, it will inevitably lead to an increase in the space occupied by the devices.

In addition, in order to separate the mist-like electrolyte from gaseous hydrogen, generally, a wire mesh demister for removing the mist-like electrolyte is arranged on a path where gas and liquid flow through. In addition to the mist-like electrolyte, there may also be some fine and small electrolyte particles, especially alkaline microparticles, remaining on the wire mesh demister. If these tiny particles are not removed in time, the wire mesh demister will inevitably be blocked by the liquid formed by the condensation of a solid and the mist-like electrolyte, thereby affecting the effect of gas-liquid separation.

SUMMARY

One advantage of the present invention is to provide a hydrogen production device, a gas-liquid separation apparatus thereof, and an electrolyte and hydrogen separating method. Liquid droplets and fine particles accumulated on a wire mesh demister can be automatically removed by means of a wire mesh dredging component.

Another advantage of the present invention is to provide a hydrogen production device, a gas-liquid separation apparatus thereof, and an electrolyte and hydrogen separating method. The gas-liquid separation apparatus can reduce the flow rate of hydrogen mixed with a mist-like electrolyte to be separated, thereby reducing the flowing away of an electrolyte in the hydrogen mixed with the mist-like electrolyte along with gas, and thus improving the hydrogen and electrolyte separation effect to obtain higher-purity hydrogen.

One advantage of the present invention is to provide a hydrogen production device, a gas-liquid separation apparatus thereof, and an electrolyte and hydrogen separating method. The gas-liquid separation apparatus has a smaller volume, and the efficient separation of hydrogen and electrolyte can be achieved by means of a single smaller-volume gas-liquid separation apparatus.

Another advantage of the present invention is to provide a hydrogen production device, a gas-liquid separation apparatus thereof, and an electrolyte and hydrogen separating method. The gas-liquid separation apparatus achieves the integration of multiple hydrogen and electrolyte separation processes in a single device by means of multiple components arranged in a small space, thereby significantly reducing the occupied space of the gas-liquid separation apparatus and also having good separation effects.

Another advantage of the present invention is to provide a hydrogen production device, a gas-liquid separation apparatus thereof, and an electrolyte and hydrogen separating method. The gas-liquid separation apparatus can wash volatilized hydrogen mixed with a mist-like electrolyte with clear water during the separation of hydrogen and electrolyte, thereby retaining an electrolyte in the hydrogen mixed with the mist-like electrolyte Another advantage of the present invention is to provide a hydrogen production device, a gas-liquid separation apparatus thereof, and an electrolyte and hydrogen separating method. The gas-liquid separation apparatus can automatically maintain the clear water washing the electrolyte at a lower concentration of electrolyte, thereby effectively reducing the dissolution of the electrolyte in the clear water and volatilization along with the hydrogen.

Another advantage of the present invention is to provide a hydrogen production device, a gas-liquid separation apparatus thereof, and an electrolyte and hydrogen separating method. The gas-liquid separation apparatus can automatically maintain the clear water washing the electrolyte at a lower temperature, thereby effectively reducing the dissolution of the electrolyte in the clear water and volatilization along with the hydrogen.

Another advantage of the present invention is to provide a hydrogen production device, a gas-liquid separation apparatus thereof, and an electrolyte and hydrogen separating method. The gas-liquid separation apparatus can maintain the separated electrolyte at a lower temperature, thereby preventing the separated electrolyte from volatilizing again and dissolving into the hydrogen mixed with the mist-like electrolyte to be separated.

To achieve the above at least one advantage of the present invention, the present invention provides a gas-liquid separation apparatus, including:

a tank, wherein an inlet is formed in a middle of the tank, a hydrogen outlet is formed in a top of the tank, and a processing chamber connected to the inlet and the hydrogen outlet is further formed in the tank; and a flow reducing component, wherein the flow reducing component is formed in the processing chamber and maintained above the inlet, the flow reducing component forms a flow reducing space and a flow partition chamber in a part of the processing chamber above the inlet, the flow reducing component forms a gas-liquid initial separation space in the processing chamber and below the flow reducing component, the flow reducing component forms at least one connection hole and a connection channel, the flow partition chamber is arranged to be connected to the flow reducing space through the at least one connection hole, the gas-liquid initial separation space is connected to the flow partition chamber through the connection channel, the flow reducing space is arranged to be connected to the hydrogen outlet, and the flow reducing space and the flow partition chamber are coaxially formed in the processing chamber.

According to another aspect of the present invention, to achieve the above at least one advantage of the present invention, the present invention provides the hydrogen production device, comprising:

at least one liquid supply component, comprising an electrolytic cell and a liquid supply member that supplies an electrolyte to the electrolytic cell;

at least one electrolysis component, for electrolysis of the electrolyte located in the electrolytic cell; and According to another aspect of the present invention, to achieve the above at least one advantage of the present invention, the present invention provides an electrolyte and hydrogen separating method, performed by the gas-liquid separation apparatus according to any one of the above gas-liquid separation apparatus, comprising the following steps:

introducing hydrogen mixed with a mist-like electrolyte into a processing chamber through an inlet; and counteracting part of a pressure of the hydrogen mixed with the mist-like electrolyte by clear water in a flow reducing space formed in a flow reducing component, to reduce a flow rate of the hydrogen mixed with the mist-like electrolyte flowing into the processing chamber, and washing an electrolyte in the hydrogen mixed with the mist-like electrolyte, wherein the flow reducing component is arranged in the processing chamber and above the inlet.

DESCRIPTION OF THE EMBODIMENTS

Figure 1:
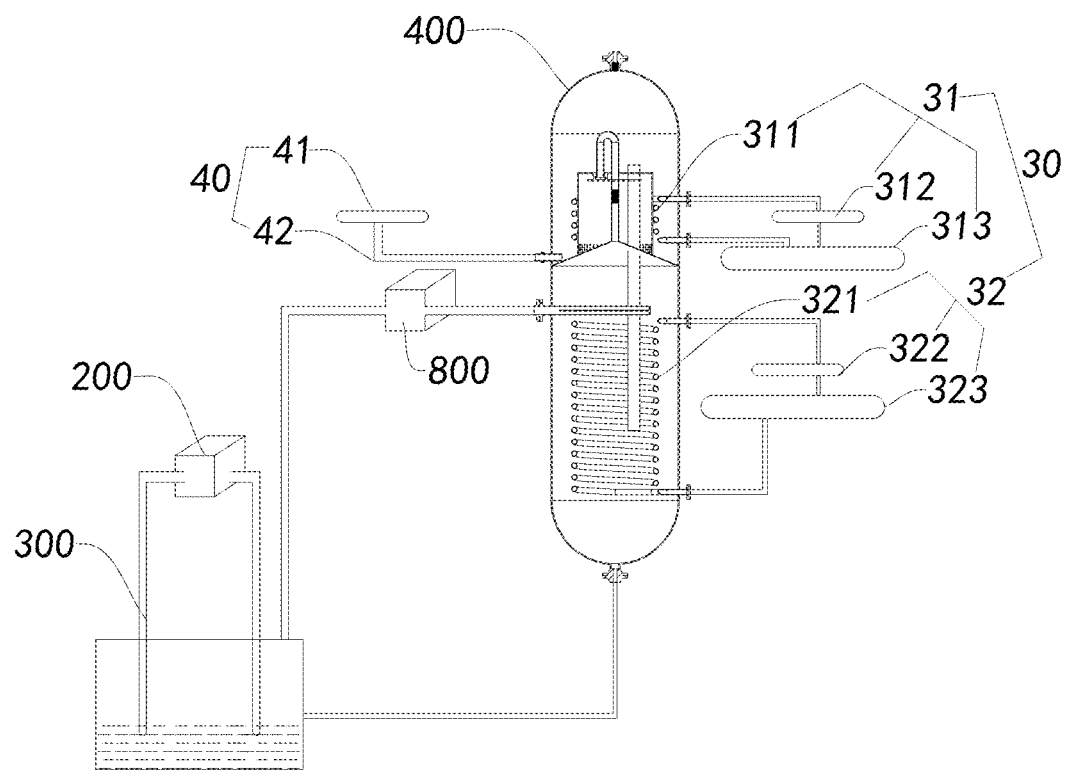
FIG. 1 shows a schematic view of a hydrogen production device of the present invention.
Figure 2:
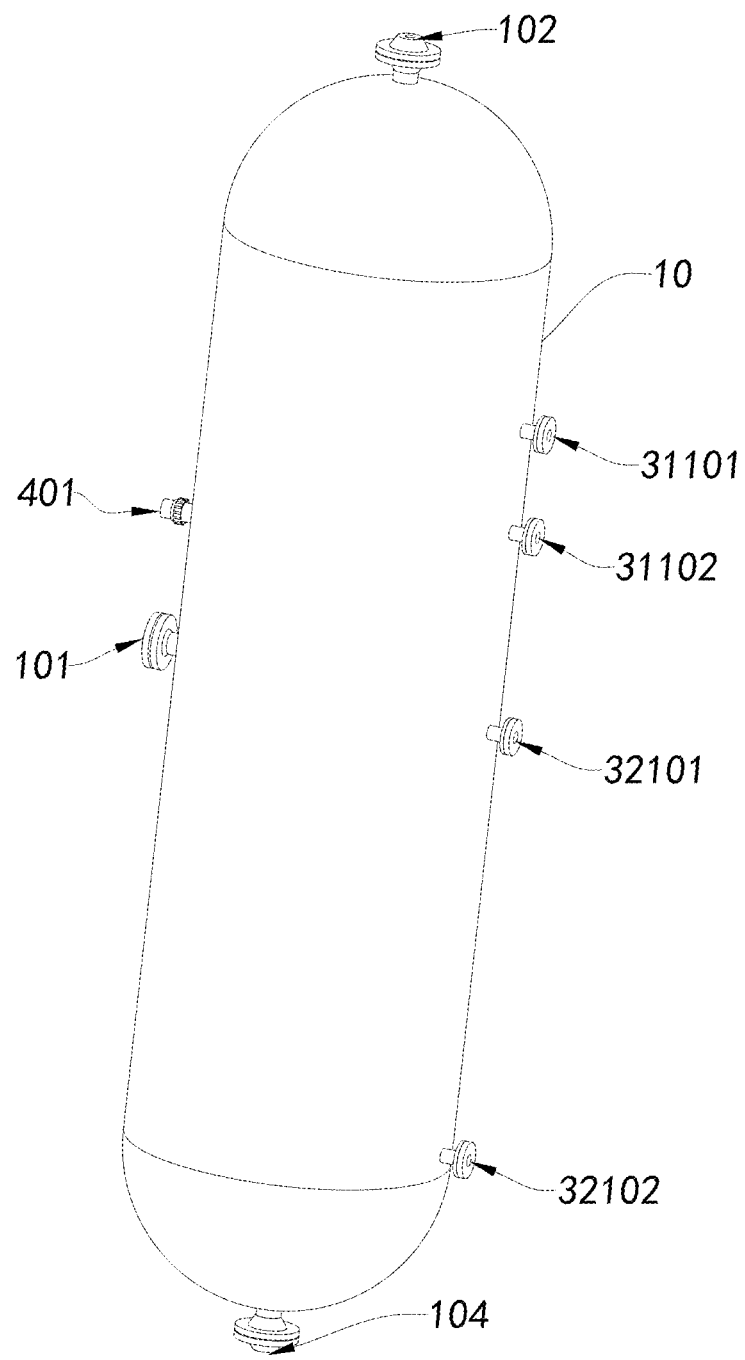
FIG. 2 shows a three-dimensional view of a gas-liquid separation apparatus of the present invention.
Figure 3:
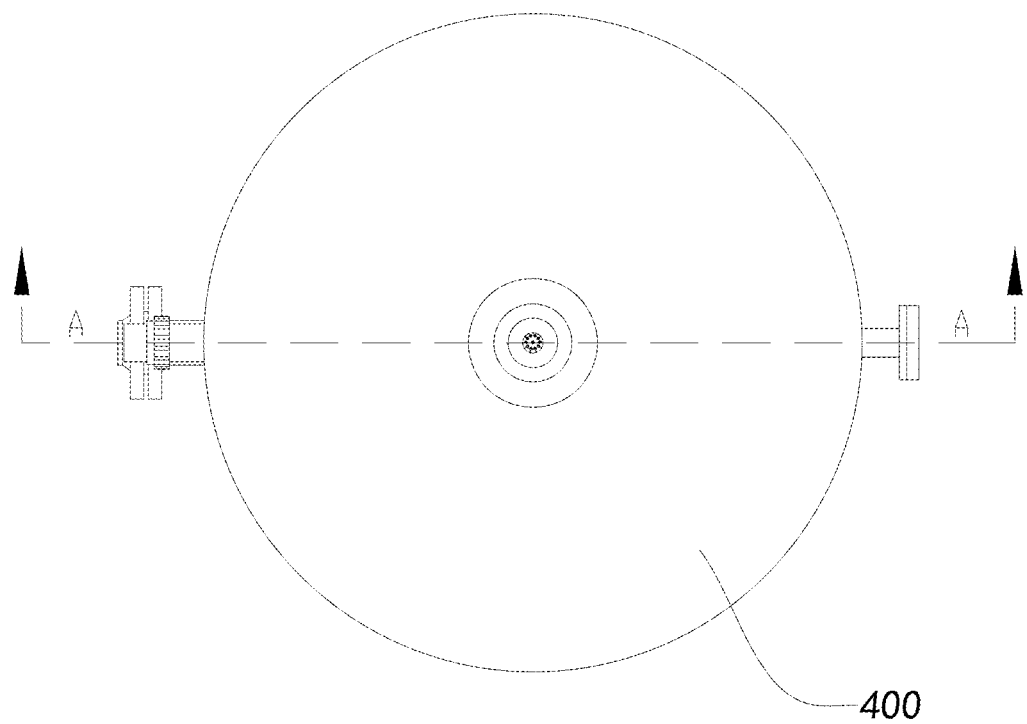
FIG. 3 shows a top view of the gas-liquid separation apparatus of the present invention.
Figure 4:
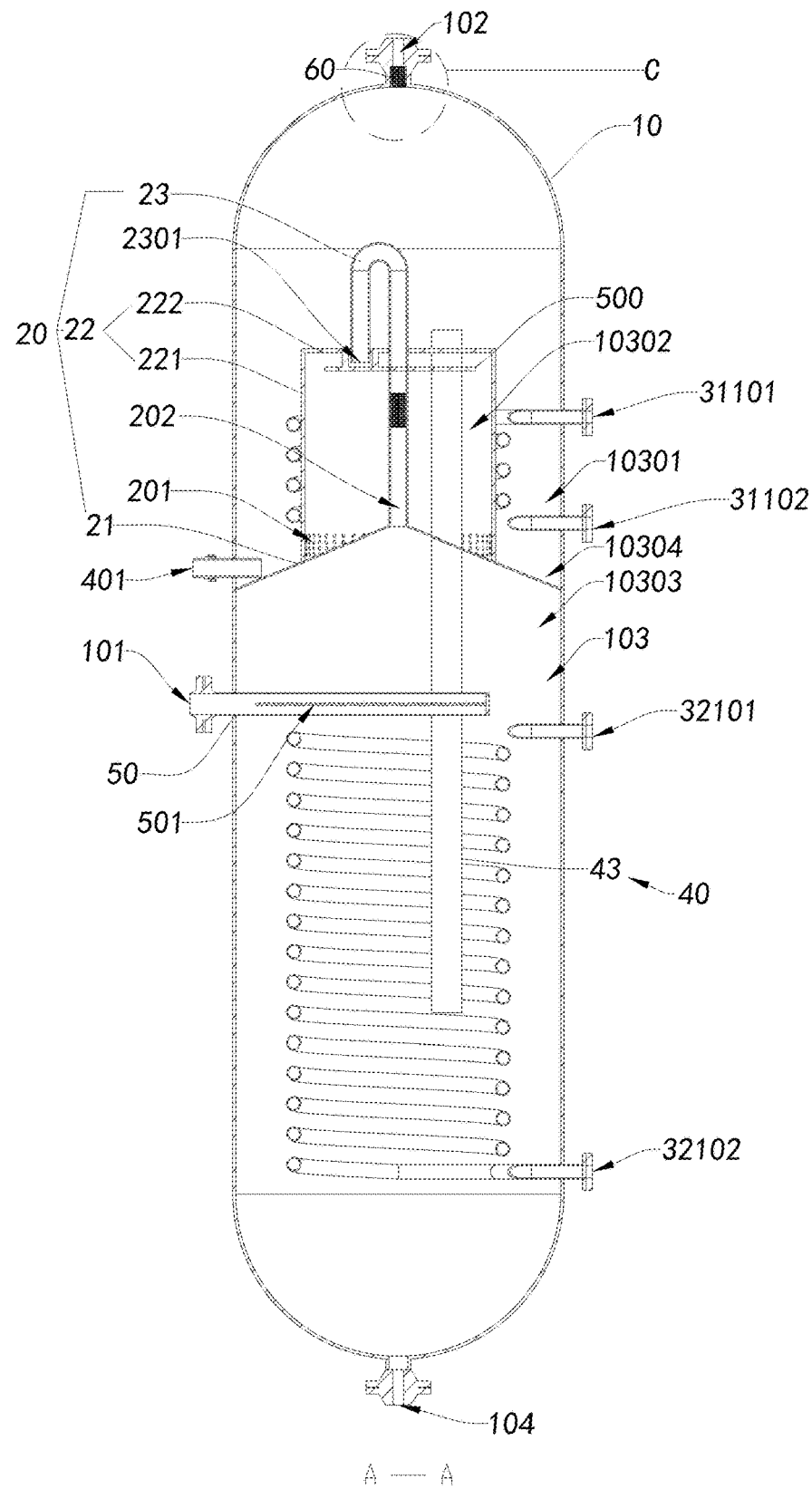
FIG. 4 shows a sectional view of direction A-A in FIG. 3.
Figure 5:
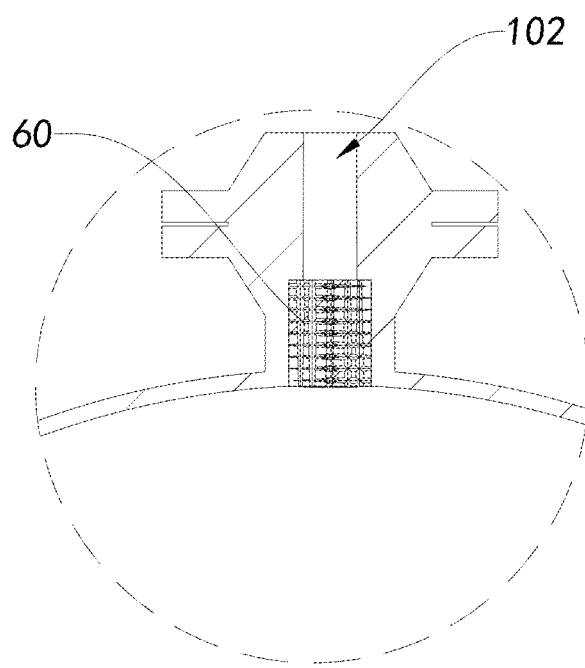
FIG. 5 shows an enlarged view of C in FIG. 4.
Figure 6:
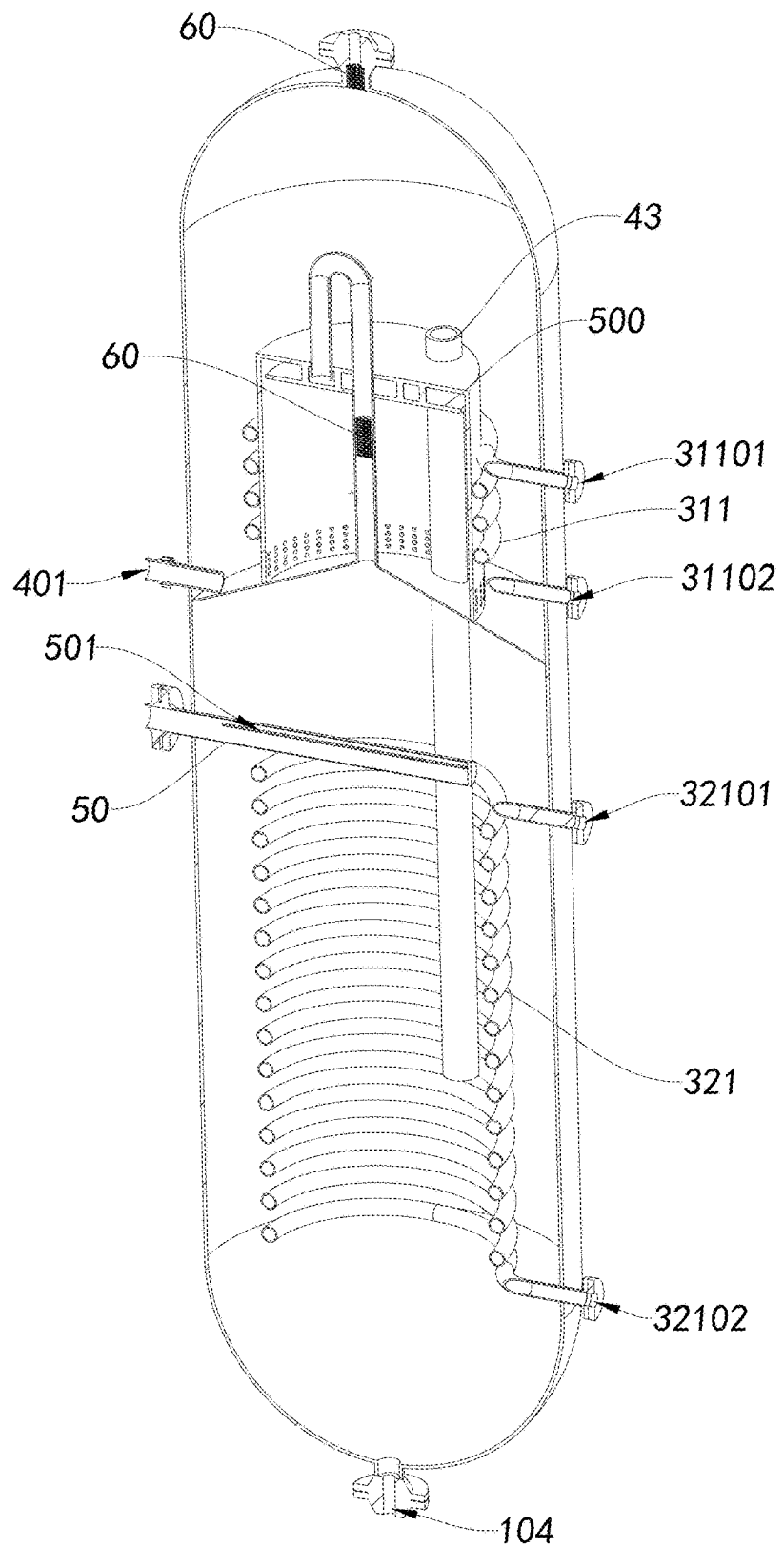
FIG. 6 shows a three-dimensional view of a partial structure after the gas-liquid separation apparatus of the present invention is cut open.
Figure 7:
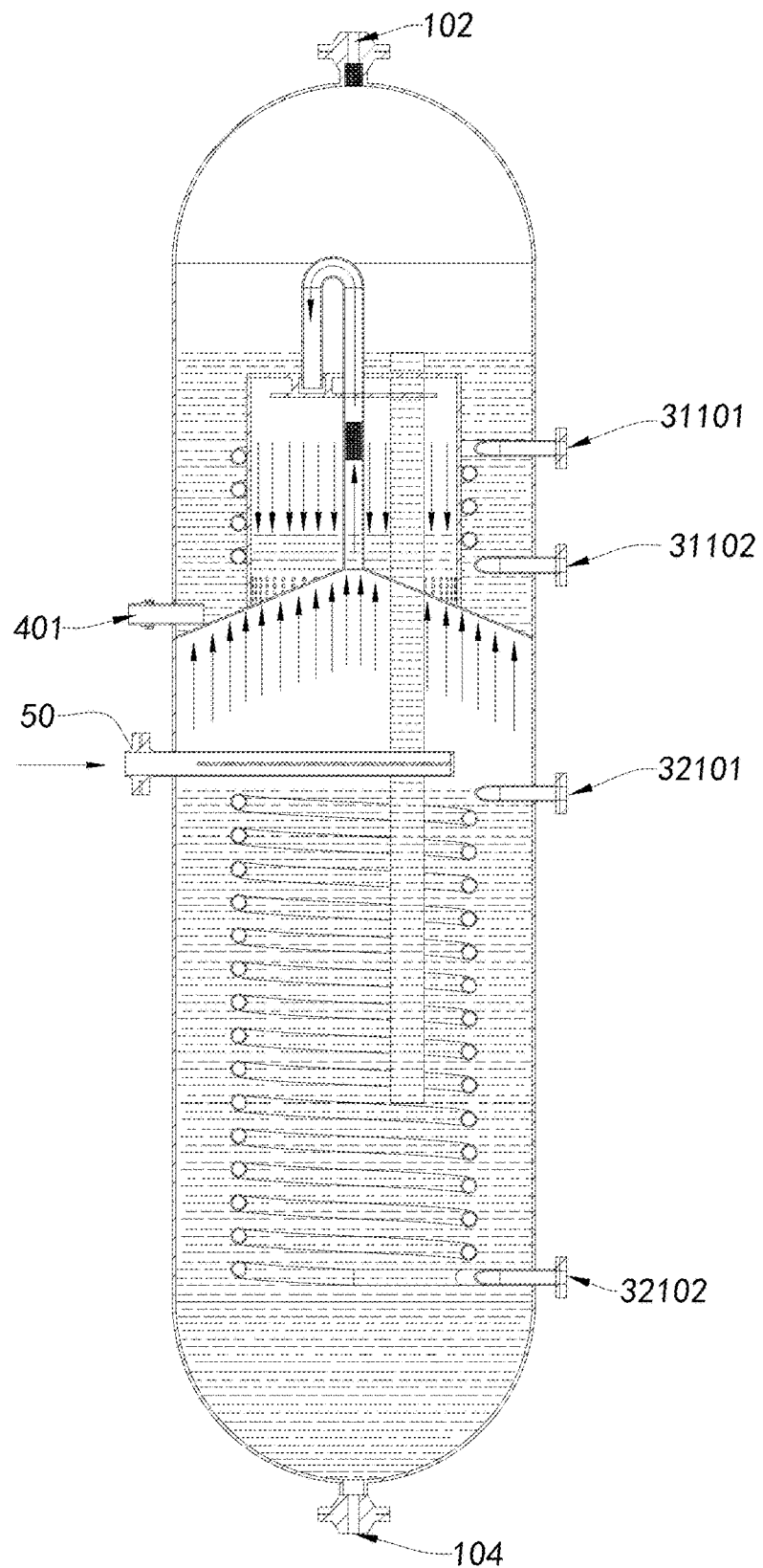
FIG. 7 shows a schematic view of the gas-liquid separation apparatus of the present invention in a state.
Figure 8:
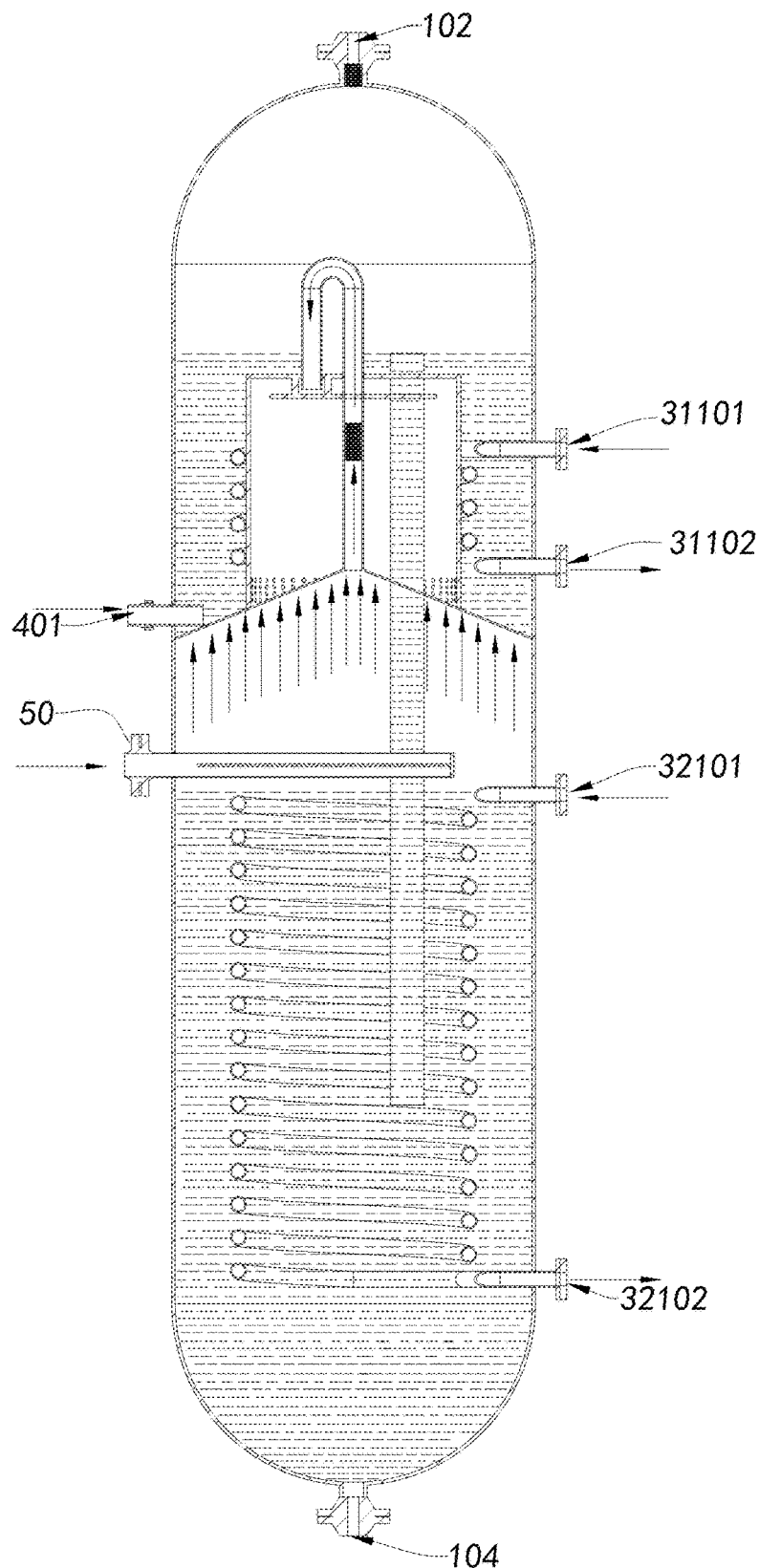
FIG. 8 shows a schematic view of the gas-liquid separation apparatus of the present invention in another state.

The following description is used to disclose the present invention to enable those skilled in the art to implement it. The preferred embodiments described below are for example only, and those skilled in the art may conceive of other obvious variations. The basic principles of the present invention defined in the following description can be applied to other implementation solutions, variation solutions, improvement solutions, equivalent solutions, and other technical solutions that do not deviate from the spirit and scope of the present invention.

Those skilled in the art should understand that in the disclosure of the present invention, the terms "longitudinal", "transverse", "upper", "lower", "front", "back", "left", "right", "vertical", "horizontal", "top", "bottom", "inside", "outside", etc. refer to the orientation or position relationship based on the orientation or position relationship shown in the drawings, which is only for the convenience of describing the present invention and simplifying the description, and not to indicate or imply that the apparatus or component referred to must have a specific orientation, be constructed and operated in a specific orientation. Therefore, the above terms cannot be understood as a limitation on the present invention.

It can be understood that the term "one" should be understood as "at least one" or "one or more", i.e., in one embodiment, the number of elements can be one, while in other embodiments, the number of elements can be multiple. The term "one" cannot be understood as a limitation on the number.

Referring to FIGS. 1 to 8, a hydrogen production device according to a preferred embodiment of the present invention will be described in detail below, wherein the hydrogen production device can electrolyze an electrolyte to form hydrogen. The hydrogen production device includes at least one electrolysis component 200, at least one liquid supply component 300, and a gas-liquid separation apparatus 400.

The liquid supply component 300 includes an electrolytic cell and a liquid supply member that supplies an electrolyte to the electrolytic cell, wherein the liquid supply member includes a pump body and a pipeline. The electrolysis component 200 is arranged to be capable of electrolyzing an electrolyte in the electrolytic cell, thereby forming hydrogen.

The gas-liquid separation apparatus 400 is connected to the electrolytic cell to separate hydrogen mixed with a mist-like electrolyte formed by volatilization from the electrolytic cell during electrolysis, and to reflux the separated electrolyte back to the electrolytic cell.

Preferably, the hydrogen mixed with the mist-like electrolyte formed by volatilization during electrolysis is rapidly delivered to the gas-liquid separation apparatus 400 through a pump body 800.

Specifically, the gas-liquid separation apparatus 400 includes a tank 10, wherein an inlet 101 is formed in a middle of the tank 10, a hydrogen outlet 102 is formed in a top of the tank 10, and a processing chamber 103 connected to the inlet 101 and the hydrogen outlet 102 is further formed in the tank 10.

The gas-liquid separation apparatus 400 further includes a flow reducing component 20, wherein the flow reducing component 20 is formed in the processing chamber 103 and maintained above the inlet 101, the flow reducing component 20 forms a flow reducing space 10301 and a flow partition chamber 10302 in a part of the processing chamber 103 above the inlet 101, and the flow reducing component 20 is arranged in the processing chamber 103 and forms a gas-liquid initial separation space 10303 below.

The flow reducing component 20 forms at least one connection hole 201 and a connection channel 202, wherein the flow partition chamber 10302 is arranged to be connected to the flow reducing space 10301 through the at least one connection hole 201, the gas-liquid initial separation space 10303 is connected to the flow partition chamber 10302 through the connection channel 202, and the flow reducing space 10301 is arranged to be connected to the hydrogen outlet 102.

It is worth mentioning that the flow reducing space 10301 is pre-filled with a predetermined amount of clear water, wherein the connection hole 201 is set to be submerged by the clear water. In this way, after the hydrogen mixed with the mist-like electrolyte that needs to be separated enters the processing chamber 103 via the inlet 101, a fluid with a predetermined flow rate passes through the gas-liquid initial separation space 10303 to be preliminarily separated and then flows towards the flow partition chamber 10302 via the connection channel 202. Due to the blockage of the channel through which the hydrogen mixed with the mist-like electrolyte flows by the clear water in the flow reducing space 10301, the liquid level of the clear water in the flow reducing space 10301 increases, and the weight of the clear water is suitable to expose the connection hole 201 after the liquid level in the flow reducing space 10301 increases, so that the hydrogen mixed with the mist-like electrolyte can continuously enter the clear water located in the flow reducing space 10301 via the connection hole 201 to be washed. In this way, due to the clear water blocking the flow path of the hydrogen mixed with the mist-like electrolyte, the flow rate of the hydrogen mixed with the mist-like electrolyte flowing into the processing chamber 103 can be reduced, and the hydrogen mixed with the mist-like electrolyte can be washed at the same time. Therefore, the flow rate of the hydrogen mixed with the mist-like electrolyte is sharply reduced after flowing to the flow reducing space 10301, so that the electrolyte in the hydrogen mixed with the mist-like electrolyte can slowly mix into the clear water. At the same time, due to the upward movement of hydrogen, the washed hydrogen can flow out of the hydrogen outlet 102 to obtain the separated and purified hydrogen. It is worth mentioning that when being washed with the clear water, the mist-like electrolyte is ruptured and diluted under the pressure of the clear water, and due to the reduced flow rate, the gas washed with the clear water and flowing upwards is high-purity hydrogen.

More specifically, the flow reducing component 20 includes a transverse partition wall 21 and a partition cylinder 22, wherein an edge of the transverse partition wall 21 is sealably mounted on an inner wall of the tank 10 that forms the processing chamber 103, to partition the processing chamber 103 into an upper space 10304 and the gas-liquid initial separation space 10303.

The partition cylinder 22 has a vertical sidewall 221 and a top sealing wall 222, wherein the vertical sidewall 221 extends towards the hydrogen outlet 102 in the top, and the top sealing wall 222 is arranged to cover a top of the vertical sidewall 221. In this way, the flow reducing space 10301 is formed in the upper space 10304 between the vertical sidewall 221, the top sealing wall 222, the transverse partition wall 21, and the inner wall of the tank 10 that forms the processing chamber 103, for storing the clear water.

In addition, the connection hole 201 is formed in a bottom of the vertical sidewall 221. Preferably, the connection holes 201 are uniformly arranged in a bottom sidewall of the vertical sidewall 221 in a circumferential direction.

It is worth mentioning that the flow partition chamber 10302 is formed between the vertical sidewall 221 and the top sealing wall 222 of the partition cylinder 22 and the transverse partition wall 21. Meanwhile, the connection channel 202 connected to the flow partition chamber 10302 is formed in a middle of the transverse partition wall 21.

Those skilled in the art can understand that the flow reducing space 10301 and the flow partition chamber 10302 are coaxially formed in the processing chamber 103, and are arranged radially. By means of this arrangement, not only can the gas-liquid separation and washing components be assembled in the processing chamber 103, but also the space occupied by the gas-liquid separation apparatus 400 can be effectively reduced.

In another preferred embodiment, the flow reducing component 20 further includes a connection member 23, wherein a bottom of the connection member 23 is arranged in the middle of the transverse partition wall 21 and extends towards the flow partition chamber 10302, and the connection channel 202 is formed in a middle of the connection member 23. The connection member 23 extends in a vertical direction to form a gas outlet 2301 in an end of the connection member 23 in the flow partition chamber 10302. That is to say, the gas outlet 2301 is arranged at a position lower than the top sealing wall 222.

As a preference, in another embodiment, a top of the connection member 23 is arranged to pass through the top sealing wall 222 and continue to extend to a predetermined height, and then be bent to pass through the top sealing wall 222, such that the gas outlet 2301 is maintained in the flow partition chamber 10302 from top to bottom. It is worth mentioning that sealing is maintained between the top sealing wall 222 and the connection member 23.

It is worth mentioning that the vertical distance between the top of the connection member 23 and the hydrogen outlet 102 is smaller than the vertical distance between the top of the liquid level of clear water maintained in the flow reducing space 10301 and the hydrogen outlet 102. In this way, when the gas pressure flowing into the processing chamber 103 decreases, the clear water located in the flow reducing space 10301 can be effectively prevented from flowing back into the flow partition chamber 10302.

Preferably, the gas-liquid separation apparatus 400 further includes a gas distribution plate 500, wherein the gas distribution plate 500 is arranged directly facing the gas outlet 2301. In this way, the hydrogen mixed with the mist-like electrolyte can be uniformly guided by the gas distribution plate 500 to the connection hole 201 in the upper bottom of the vertical sidewall 221, thereby preventing the connection hole 201 from being submerged by the clear water located in the flow reducing space 10301 flowing back into the flow partition chamber 10302 through the connection hole 201 due to uneven gas distribution, thus ensuring the effect of the electrolyte in the washed hydrogen gas mixed with the mist-like electrolyte.

As a preference, the gas-liquid separation apparatus 400 further includes an electrolyte retention component 30, wherein the electrolyte retention component 30 includes a first cooling member 31, the first cooling member 31 includes a first heat exchange member 311, and the first heat exchange member 311 is arranged in the flow reducing space 10301, so that the temperature of the clear water located in the flow reducing space 10301 can be reduced by means of heat exchange, thereby allowing the electrolyte in the hydrogen mixed with the mist-like electrolyte to condense when it is retained by the clear water located in the flow reducing space 10301, while also reducing the volatilization rate of the electrolyte dissolved in the clear water.

Preferably, the first cooling member 31 further includes a first guide pump 312 and a first condenser 313, wherein the first guide pump 312, the first condenser 313 and the first heat exchange member 311 are connected to each other, and the first guide pump 312 is arranged to guide a refrigerant continuously to pass through the first condenser 313 to be cooled and then flow to the first heat exchange member 311, so that the first heat exchange member 311 can maintain, by means of heat exchange, the temperature of the clear water located in the flow reducing space 10301 at a temperature suitable for condensing the electrolyte in the hydrogen mixed with the mist-like electrolyte. Preferably, the first cooling member 31 is arranged in the processing chamber 103, and a first refrigerant inlet 31101 and a first refrigerant outlet 31102 are formed in the tank 10. The first refrigerant inlet 31101 and the first refrigerant outlet 31102 are connected to the first guide pump 312 and the first condenser 313.

Furthermore, the gas-liquid separation apparatus 400 further includes a liquid exchange component 40, wherein the liquid exchange component 40 includes at least one circulating pump 41 and a set of circulating pipes 42. The gas-liquid separation apparatus 400 forms a liquid exchange inlet 401 connected to the flow reducing space 10301 and a liquid exchange outlet connected to the flow reducing space 10301. The circulating pump 41 is arranged to be connected to the set of circulating pipes 42, wherein one of the circulating pipes 42 is connected to a clear water source through the liquid exchange inlet 401, and one of the circulating pipes 42 is connected to the liquid exchange outlet and connected to the circulating pump 41, thereby guiding out a liquid located in the flow reducing space 10301. In a preferred embodiment, both the liquid exchange inlet 401 and the liquid exchange outlet are formed by the tank 10 forming the upper space 10304.

In this way, after the clear water located in the flow reducing space 10301 washes the hydrogen mixed with the mist-like electrolyte, a low concentration of electrolyte can be still maintained, thus effectively preventing excessive electrolyte from volatilizing along with the clear water to mixing into the washed hydrogen again.

It is worth mentioning in particular that by means of the combination of the liquid exchange component 40 and the first cooling member 31 of the electrolyte retention component 30, higher-purity hydrogen can be separated.

In another embodiment, the liquid exchange component 40 includes at least one overflow pipe 43. In this embodiment, at least one liquid exchange inlet 401 connected to the flow reducing space 10301 is formed in the tank 10.

In this embodiment, the overflow pipe 43 is arranged to pass through the transverse partition wall 21, and a vertical distance between a top end of the overflow pipe 43 and the hydrogen outlet 102 is greater than a vertical distance between a highest part of the connection member 23 and the hydrogen outlet 102. In this way, in the process of introducing clear water into the flow reducing space 10301, the liquid level of the clear water located in the flow reducing space 10301 will not be higher than the top end of the overflow pipe 43, so that the clear water can be effectively prevented from flowing back into the flow partition chamber 10302 due to the too high liquid level caused by excessive dissolution of the electrolyte, thereby avoiding the connection hole 201 from being submerged.

A bottom of the overflow pipe 43 extends to a bottom of the processing chamber 103 of the tank 10.

In one embodiment, the gas-liquid separation apparatus 400 includes an initial separation member 50, wherein the inlet 101 is formed in one end of the initial separation member 50, which is transversely maintained in an extending manner in the processing chamber 103. A set of ventilation holes 501 is arranged in the side of the initial separation member 50. It is worth mentioning that when the hydrogen mixed with the mist-like electrolyte enters the initial separation member 50 via the inlet 101, the mist-like electrolyte in the hydrogen mixed with the mist-like electrolyte is obstructed and cooled by the wall of the initial separation member 50, and will form liquid droplets inside the initial separation member 50, and the liquid will fall to the bottom of the processing chamber 103 through the ventilation holes 501.

Due to the fact that the ventilation holes 501 are arranged in the side of the initial separation member 50, the liquid droplets will slide away from the ventilation holes 501 under the action of gravity, thus effectively preventing the liquid droplets from aggregation and blockage at the ventilation holes 501.

Preferably, the electrolyte retention component 30 further includes a second cooling member 32, wherein the second cooling member 32 includes a second heat exchange member 321, and the second heat exchange member 321 of the second cooling member 32 is arranged at the bottom of the processing chamber 103 to cool the liquid electrolyte deposited at the bottom of the processing chamber 103, thereby effectively preventing the electrolyte dripping onto the bottom of the processing chamber 103 from volatilizing again and mixing into the gas.

Specifically, the second cooling member 32 includes a second guide pump 322 and a second condenser 323, wherein the second guide pump 322, the second condenser 323 and the second heat exchange member 321 are connected to each other, and the second guide pump 322 is arranged to guide a refrigerant continuously to pass through the second condenser 323 to be cooled and then flow to the second heat exchange member 321, so that the second heat exchange member 321 can maintain, by means of heat exchange, the temperature of the electrolyte located in the bottom of the processing chamber 103 below a temperature of volatilization. Preferably, the second cooling member 32 is arranged at the bottom of the processing chamber 103, and a second refrigerant inlet 32101 and a second refrigerant outlet 32102 are formed in the tank 10. The second refrigerant inlet 32101 and the second refrigerant outlet 32102 are connected to the second guide pump 322 and the second condenser 323.

Preferably, the tank 10 forms, in the bottom of the processing chamber 103, an electrolyte outlet 104 connected to the processing chamber 103.

It is worth mentioning that the hydrogen outlet 102 is connected to a hydrogen storage tank. Both the electrolyte outlet 104 and the liquid exchange component 40 are connected to the liquid supply member of the liquid supply component 300. In this way, not only can the separation of the hydrogen and the mist-like electrolyte be achieved, but also the electrolyte can be recovered and recycled.

More preferably, the gas-liquid separation apparatus 400 further includes at least one wire mesh demister 60, wherein the at least one wire mesh demister 60 is arranged in the connection channel 202. As a preference, the at least one wire mesh demister 60 is arranged at the hydrogen outlet 102.

Those skilled in the art can understand that the wire mesh demister 60 is capable of initial interception of the mist-like electrolyte. Additionally, as the hydrogen outlet 102 is also provided with the wire mesh demister 60, the higher-purity hydrogen can be intercepted again when being obtained by separation, thereby further improving the purity of the obtained hydrogen.

Referring to FIGS. 9 to 13, in a variation embodiment, the gas-liquid separation apparatus 400 further includes a wire mesh dredging component 70, wherein the at least one wire mesh demister 60 is movably mounted in the connection channel 202 through the wire mesh dredging component 70. Specifically, the wire mesh demister 60 is movably mounted in the connection channel 202 formed by the connection member 23 through the wire mesh dredging component 70.

Figure 11:
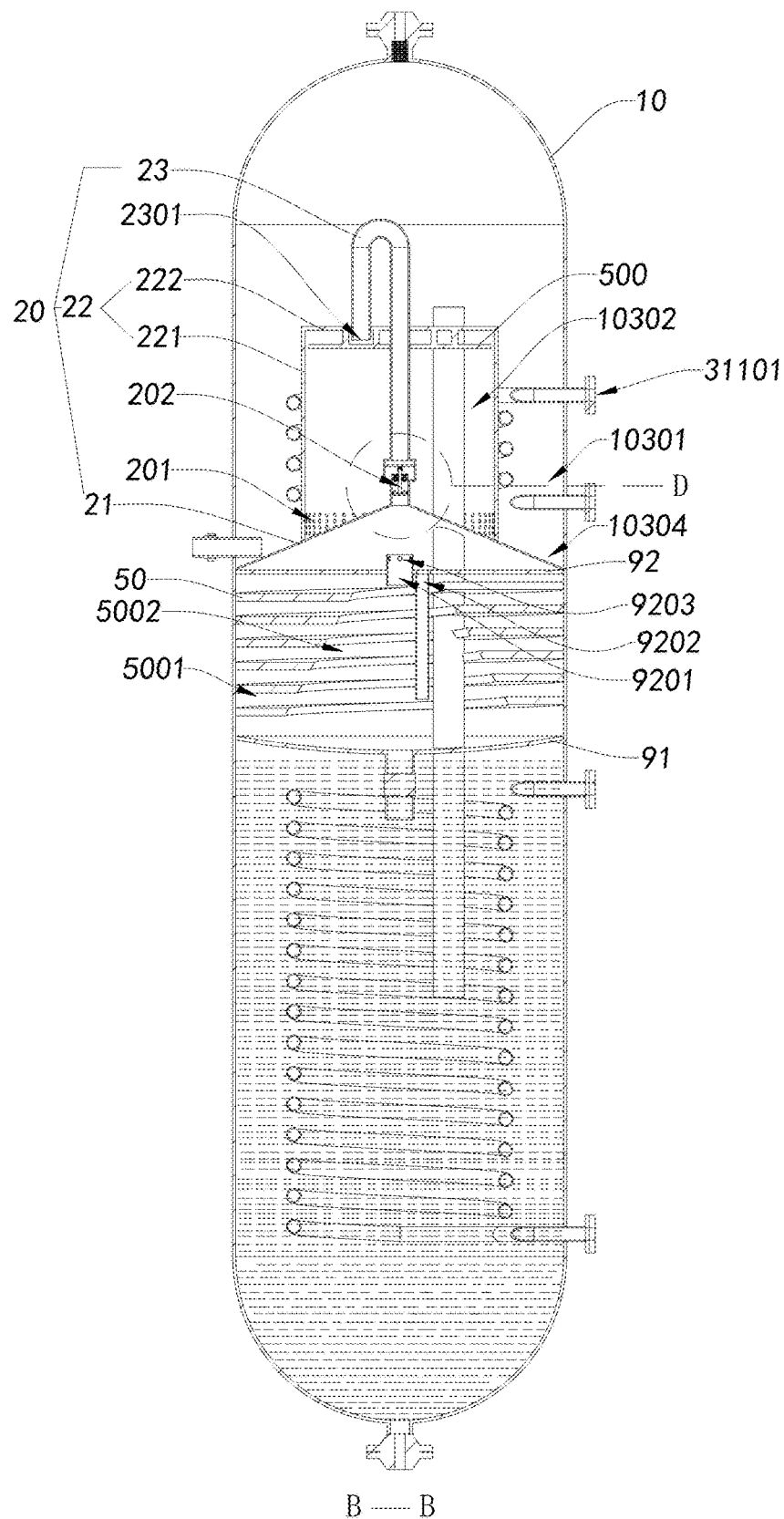
FIG. 11 shows a sectional view of direction B-B in FIG. 10.
Figure 12:
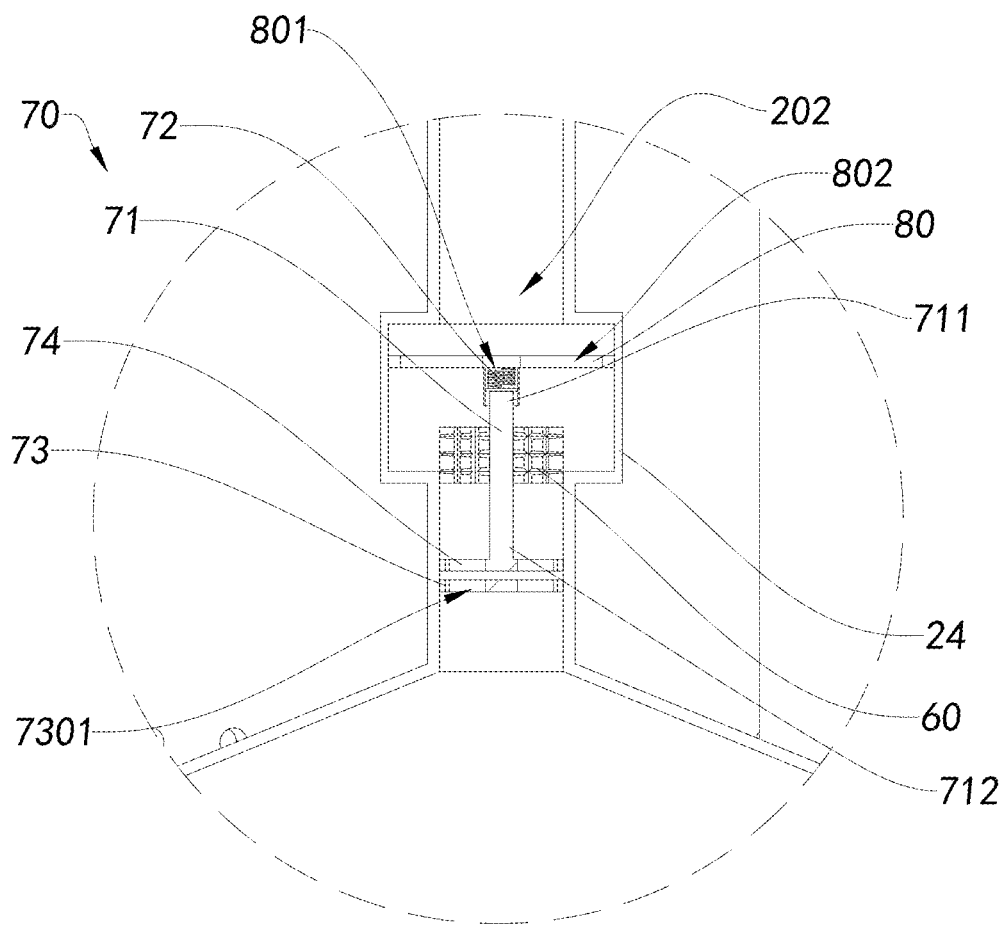
FIG. 12 shows an enlarged view of D in FIG. 11.
Figure 13:
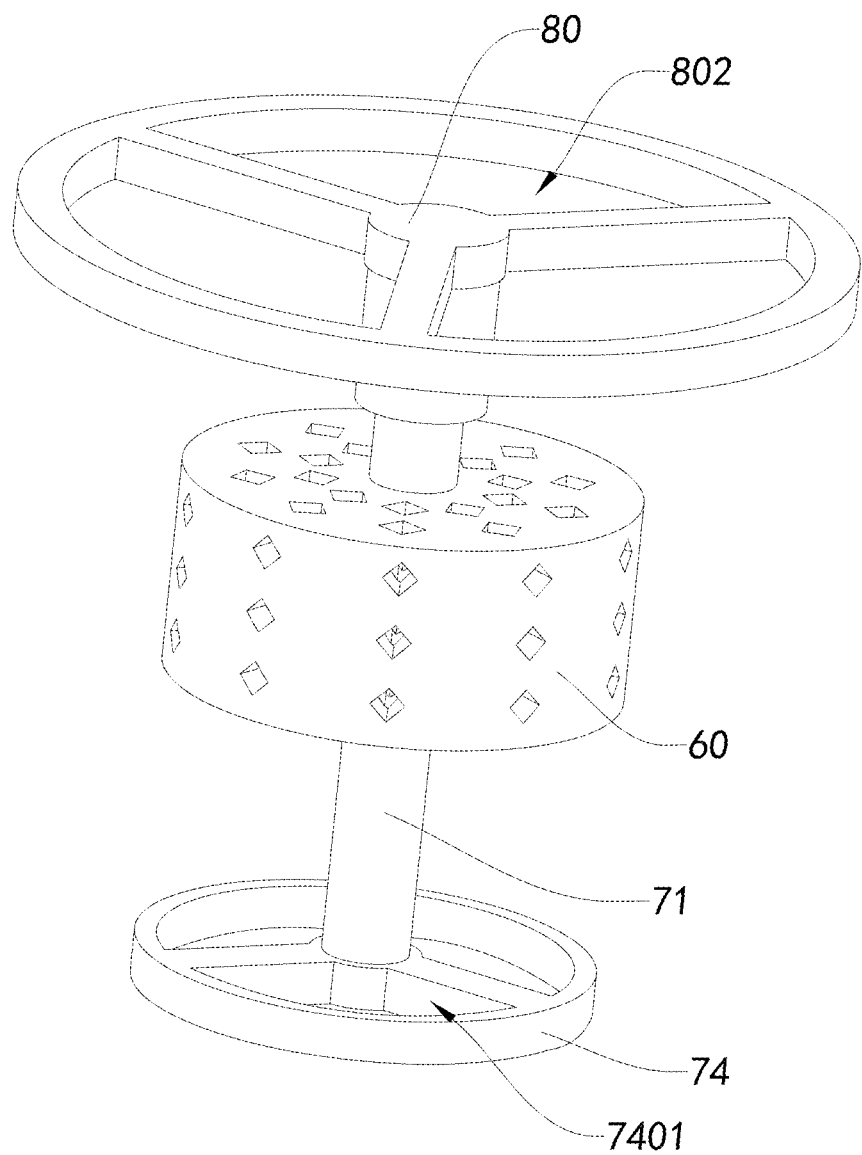
FIG. 13 shows a three-dimensional view of a partial structure of the second embodiment of the gas-liquid separation apparatus of the present invention.

In particular, referring to FIGS. 11 to 13, specifically, the wire mesh dredging component 70 includes a guide rod 71, an elastic member 72, and a stop member 73. The guide rod 71 is arranged to extend in the axial direction of the connection channel 202, and the guide rod 71 has a high end 711 and a low end 712. Meanwhile, a reduction part 24 is formed in the inner wall of the connection channel 202, wherein the diameter of section of the reduction part 24 is greater than that of other parts of the connection channel 202.

The stop member 73 is fixed to the connection channel 202, and at least one connection window 7301 is formed in a middle of the stop member 73 to be connected to the connection channel 202. The low end 712 of the guide rod 71 is pressed against the stop member 73. In addition, a mounting member 80 is arranged in part of the connection channel 202 formed by the reduction part 24, wherein a mounting chamber 801 is formed downwards in a middle of the mounting member 80 in an axial direction, the high end 711 of the guide rod 71 is slidably inserted into the mounting chamber 801, and the elastic member 72 is arranged in the mounting chamber 801 and is located between the mounting member 80 and the high end 711 of the guide rod 71, so that the guide rod 71 tends to move downwards in an axial direction and is pressed against the stop member 73. Meanwhile, the at least one wire mesh demister 60 is mounted on the guide rod 71, and a part thereof is located at the reduction part 24 of the connection channel 202. Moreover, at least one open window 802 connected to the connection channel 202 is also formed in the middle of the mounting member 80.

In the process of normal gas-liquid separation, the wire mesh demister 60 located on the guide rod 71 can be maintained in the connection channel 202, and when passing through the connection channel 202, the hydrogen mixed with the mist-like electrolyte can be filtered out by the wire mesh demister 60 located on the guide rod 71. However, as the increase of liquid deposited on the wire mesh demister 60 and the accumulation of fine particles in the electrolyte, once the wire mesh demister 60 on the guide rod 71 is partially blocked, the gas pressure in the gas-liquid initial separation space 10303 will sharply increase, while the gas pressure in the flow partition chamber 10302 will still decrease, allowing the wire mesh demister 60 to be pushed and drive the guide rod 71 to slide along the mounting chamber 801, thereby allowing the low end 712 of the guide rod 71 to be away from the stop member 73 and allowing the wire mesh demister 60 located on the guide rod 71 to completely moved to the connection channel 202 formed by the reduction part 24. Since the diameter of section of the reduction part 24 is greater than that of the wire mesh demister 60 mounted on the guide rod 71, the gas located in the gas-liquid initial separation space 10303 will quickly flow into the flow partition chamber 10302 via a gap between the wire mesh demister 60 and the inner wall of the reduction part 24. Accordingly, the gas pressure in the gas-liquid initial separation space 10303 will sharply decrease. Correspondingly, under the elastic force of the elastic member 72, the guide rod 71 quickly resets, allowing the low end 712 of the guide rod 71 to quickly collide with the middle of the stop member 73, thereby allowing the liquid droplets and fine particles accumulated on the wire mesh demister 60 to fall under the action of inertia and vibration. In this way, the gas-liquid separation apparatus can not only automatically clean the wire mesh demister 60 located in the connection channel 202, but also effectively prevent the inability of the gas-liquid separation apparatus to function normally due to the blockage of the wire mesh demister 60 located in the connection channel 202.

As a preference, the wire mesh dredging component 70 further includes a guiding limit member 74, wherein the guiding limit member 74 has at least one window 7401 connected to the connection channel 202. The guiding limit member 74 is mounted on the low end 712 of the guide rod 71, and the outer wall thereof abuts against the inner wall forming the connection channel 202, so that the direction of movement of the guide rod 71 is maintained in an axial direction when moving.

Figure 9:
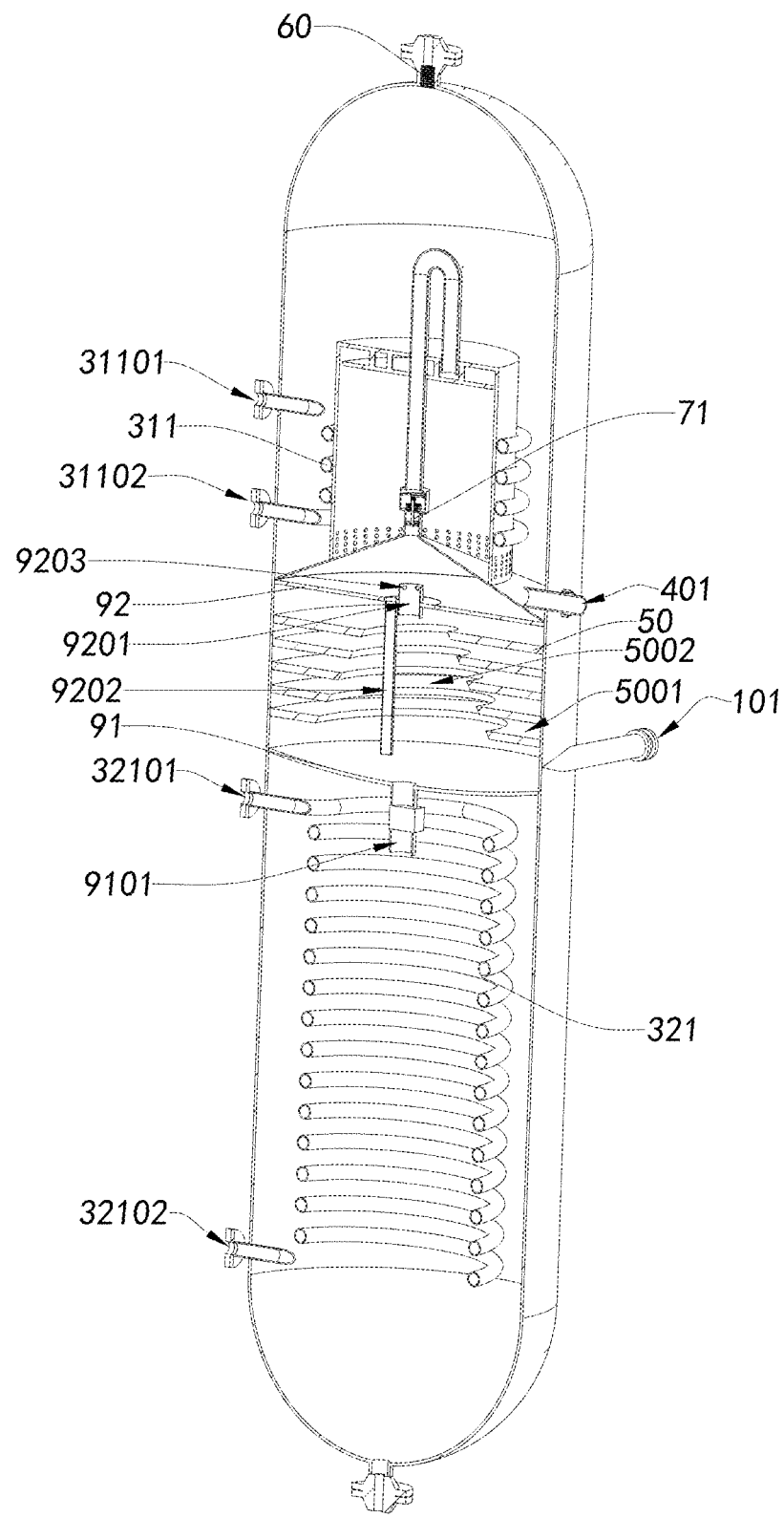
FIG. 9 shows a three-dimensional cut-open view of a second embodiment of the gas-liquid separation apparatus of the present invention.
Figure 10:
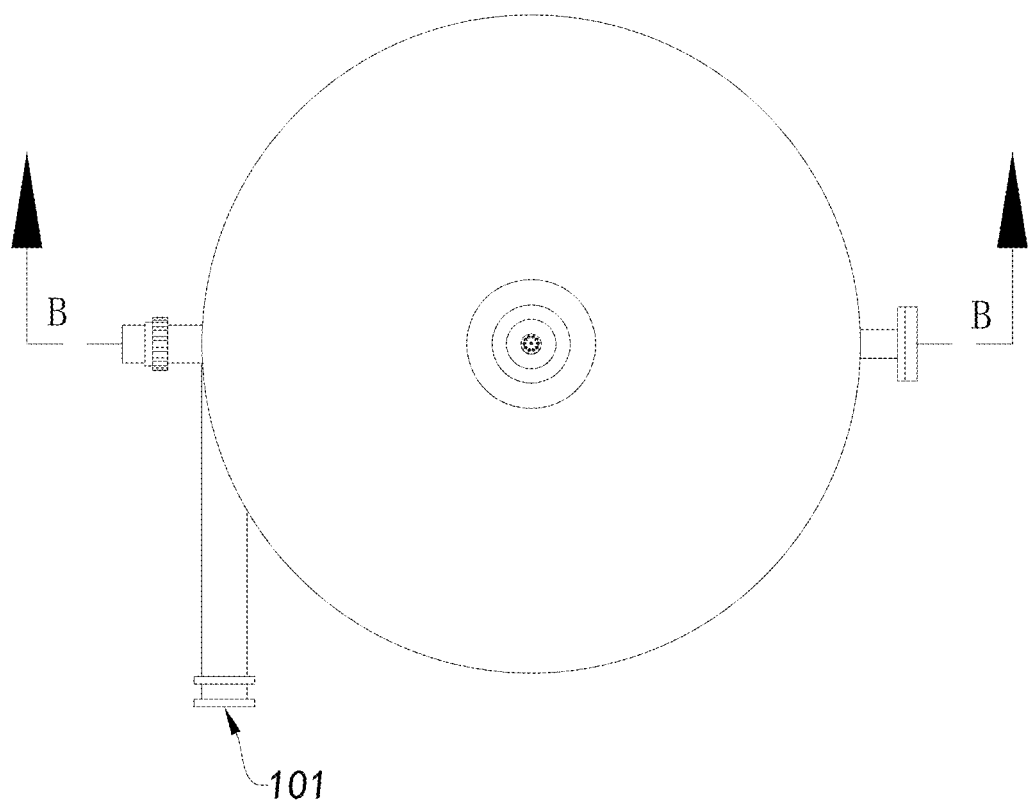
FIG. 10 shows a top view of the second embodiment of the gas-liquid separation apparatus of the present invention.

Referring to FIGS. 9 to 11, in a variation embodiment, the gas-liquid separation apparatus 400 includes an initial separation member 50, which is arranged as a spiral body that spirals up along the inner wall of the processing chamber 103 formed by the tank 10 and has a gradually increasing size of section. The spiral body is arranged in the gas-liquid initial separation space 10303 from bottom to top and form a spiral initial separation channel 5001, and a flow rising channel 5002 with a gradually decreasing size of section from bottom to top is formed in a middle of the spiral body.

It is worth mentioning that the inlet 101 is set to be connected to a bottom end of the spiral initial separation channel 5001 from a tangent direction with the tank 10. In this way, when the hydrogen mixed with the mist-like electrolyte enters from the inlet 101, most of the hydrogen mixed with the mist-like electrolyte can detour along the spiral initial separation channel 5001, thereby prolonging the time and path of initial separation of the hydrogen mixed with the mist-like electrolyte, so as to enable the electrolyte in the hydrogen mixed with the mist-like electrolyte to condense for a long time and flow towards the flow rising channel 5002 along the spiral initial separation channel 5001 and fall from the flow rising channel 5002 to the bottom of the processing chamber 103.

As a preference, the gas-liquid separation apparatus further includes a first partition member 91 and a second partition member 92, wherein the first partition member 91 is arranged at a position below the inlet 101 in the processing chamber 103, and the second partition member 92 is arranged at a position above the top of the spiral body in the gas-liquid initial separation space 10303.

A central-through channel 9101 is formed in a middle of the first partition member 91, wherein the central-through channel 9101 is arranged to extend into the electrolyte at the bottom of the processing chamber 103. The arranged first partition member 91 can reduce the opening size of volatilization of the electrolyte deposited at the bottom of the processing chamber 103, thereby reducing the volatilization of the electrolyte. As shown in FIG. 11, as a preference, the middle of the first partition member 91 is arranged to be concave towards the bottom of the processing chamber 103, so that the liquid electrolyte condensed in the hydrogen mixed with the mist-like electrolyte entering the processing chamber 103 can flow intensively to the bottom of the processing chamber 103 through the central-through channel 9101 of the first partition member 91.

A middle channel 9201 is formed in a middle of the second partition member 92 in an axial direction, wherein the middle channel 9201 is connected to the flow rising channel 5002 from top to bottom. In addition, a negative pressure channel 9202 is formed in the middle of the second partition member 92 in the axial direction, wherein the negative pressure channel 9202 is also connected to the flow rising channel 5002, the middle channel 9201 is arranged to be coaxial with the flow rising channel 5002, the negative pressure channel 9202 is arranged to deviate from the axial direction of the flow rising channel 5002, and a bottom of the negative pressure channel 9202 extends downwards to the horizontal plane where the inlet 101 is located, so that the bottom of the negative pressure channel 9202 is located on a path of gas entering from the inlet 101.

It is worth mentioning that when the gas is rapidly introduced from the inlet 101 by the pump body 800, due to the fast flow rate and an opening in the bottom of the negative pressure channel 9202 being located in a tangent direction of the gas entering from the inlet 101, the flow rate of the gas at the opening in the bottom of the negative pressure channel 9202 is relatively fast. According to the Venturi effect, a fluid with a faster flow rate will have a lower pressure, resulting in a negative pressure that can suck down the liquid droplets or fine particles deposited on the second partition member 92, thereby enabling the liquid droplets or fine particles deposited on the second partition member 92 to fall down to the bottom of the processing chamber 103 via the negative pressure channel 9202.

Further, the top of the flow rising channel 5002 of the second partition member 92 is blocked, and the top sidewall thereof extend radially to form a plurality of air outlets 9203. In this way, the hydrogen mixed with the mist-like electrolyte needs to change direction when passing through the second partition member 92, so that the electrolyte in the hydrogen mixed with the mist-like electrolyte can be more intercepted at the top of the second partition member 92. Moreover, due to the negative pressure formed by the negative pressure channel 9202, the intercepted electrolyte can be sucked to the bottom of the processing chamber 103.

According to another aspect of the present invention, a hydrogen separation method according to a preferred embodiment of the present invention will be elaborated in detail below, wherein the hydrogen separation method includes the following steps:

S1001, introducing hydrogen mixed with a mist-like electrolyte into a processing chamber 103 through an inlet 101; and S1002, counteracting part of a pressure of the hydrogen mixed with the mist-like electrolyte by clear water in a flow reducing space 10301 formed in a flow reducing component 20, to reduce a flow rate of the hydrogen mixed with the mist-like electrolyte flowing into the processing chamber 103, and washing an electrolyte in the hydrogen mixed with the mist-like electrolyte, wherein the flow reducing component 20 is arranged in the processing chamber 103 and above the inlet 101.

Preferably, the hydrogen separation method includes the following steps:

S1003, maintaining a temperature of the clean water at a preset low temperature by a first cooling member 31, to reduce volatilization of the electrolyte dissolved in the clear water. Preferably, the hydrogen separation method includes the following steps:

S1004, maintaining a concentration of the electrolyte in the clear water located in a flow reducing space 10301 at a preset low concentration by a liquid exchange component 40.

Those skilled in the art should understand that the above description and the embodiments of the present invention shown in the drawings are merely examples and do not limit the present invention. The advantages of the present invention have been fully and effectively realized. The functions and structural principles of the present invention have been demonstrated and explained in the embodiments, and without deviating from the principles, the implementations of the present invention may have any deformation or modification.

What is claimed is:

1. A gas-liquid separation apparatus, comprising:
a tank, wherein an inlet is formed in a middle of the tank, a hydrogen outlet is formed in a top of the tank, and a processing chamber connected to the inlet and the hydrogen outlet is further formed in the tank; and
a flow reducing component, wherein the flow reducing component is formed in the processing chamber and maintained above the inlet, the flow reducing component forms a flow reducing space and a flow partition chamber in a part of the processing chamber above the inlet, a gas-liquid initial separation space is formed in the processing chamber at a position below the flow reducing component, the flow reducing component forms at least one connection hole and a connection channel, the flow partition chamber is arranged to be connected to the flow reducing space through the at least one connection hole, the gas-liquid initial separation space is connected to the flow partition chamber through the connection channel, the flow reducing space is arranged to be connected to the hydrogen outlet, the flow reducing space and the flow partition chamber are coaxially formed in the processing chamber, the flow reducing component comprises a transverse partition wall and a partition cylinder, an edge of the transverse partition wall is sealably mounted on an inner wall of the tank, the partition cylinder has a vertical sidewall and a top sealing wall, the vertical sidewall extends towards the hydrogen outlet in the top, the top sealing wall is arranged to cover a top of the vertical sidewall, the flow reducing space is formed in an upper space between the vertical sidewall, the top sealing wall, the transverse partition wall, and the inner wall of the tank, for storing clear water, the connection hole is formed in a bottom of the vertical sidewall, the flow partition chamber is formed between the vertical sidewall and the top sealing wall of the partition cylinder and the transverse partition wall, the flow reducing component comprises a connection member, a bottom of the connection member is arranged in a middle of the transverse partition wall and extends towards the flow partition chamber, the connection channel is formed in a middle of the connection member, the connection member extends in a vertical direction, and a gas outlet is formed in an end of the connection member in the flow partition chamber, wherein the flow reducing space is arranged to be pre-filled with a predetermined amount of clear water, the connection hole is set to be submerged by the clear water, after the hydrogen mixed with a mist-like electrolyte that needs to be separated enters the processing chamber via the inlet, the hydrogen mixed with the mist-like electrolytet is directed to the gas-liquid initial separation space, so as to be preliminarily separated, and then the hydrogen mixed with the mist-like electrolytet flows upward through the connection channel and flows downwards into the flow partition chamber via the gas outlet of the connection member, a liquid level of the clear water in the flow reducing space increases while a water level of the clear water in the flow partition chamber decreases to expose the connection hole, the hydrogen mixed with the mist-like electrolyte enters the clear water located in the flow reducing space via the connection hole, so as to be washed in the flow reducing space, so that the electrolyte in the hydrogen mixed with the mist-like electrolyte is mixed into the clear water while the washed hydrogen is allowed to flow out of the hydrogen outlet.

2. The gas-liquid separation apparatus according to claim 1, wherein a top of the connection member is arranged to pass through the top sealing wall and continue to extend to a predetermined height, and then be bent to pass through the top sealing wall, such that the gas outlet is maintained in the flow partition chamber from top to bottom, wherein the gas-liquid separation apparatus further comprises at least one overflow pipe, wherein at least one liquid exchange inlet connected to the flow reducing space is formed in the tank, the overflow pipe is arranged to pass through the transverse partition wall, and a vertical distance between a top end of the overflow pipe and the hydrogen outlet is greater than a vertical distance between the top of the connection member and the hydrogen outlet, so that in the process of introducing clear water into the flow reducing space, the liquid level of the clear water located in the flow reducing space will not be higher than the top end of the overflow pipe.

3. The gas-liquid separation apparatus according to claim 1, comprising a gas distribution plate, wherein the gas distribution plate is arranged directly facing the gas outlet.

4. The gas-liquid separation apparatus according to claim 1, comprising an electrolyte retention component, wherein the electrolyte retention component comprises a first cooling member, the first cooling member comprises a first heat exchange member, the first heat exchange member is arranged in the flow reducing space, and a first refrigerant inlet and a first refrigerant outlet are formed in the tank.

5. The gas-liquid separation apparatus according to claim 1, comprising a liquid exchange component, wherein the liquid exchange component comprises at least one overflow pipe, at least one liquid exchange inlet connected to the flow reducing space is formed in the tank, a vertical distance between a top end of the overflow pipe and the hydrogen outlet is greater than a vertical distance between a highest part of the connection member and the hydrogen outlet, and a bottom of the overflow pipe extends to a bottom of the processing chamber of the tank.

6. The gas-liquid separation apparatus according to claim 1, comprising at least one wire mesh demister, wherein the at least one wire mesh demister is arranged in the connection channel, and the at least one wire mesh demister is arranged at the hydrogen outlet, the gas-liquid separation apparatus further comprises a wire mesh dredging component, wherein the at least one wire mesh demister is movably mounted in the connection channel through the wire mesh dredging component, the wire mesh dredging component comprises a guide rod, an elastic member, and a stop member, the guide rod is arranged to extend in an axial direction of the connection channel, and the guide rod has a high end and a low end, wherein a reduction part is formed in an inner wall of the connection channel, wherein a diameter of section of the reduction part is greater than that of other parts of the connection channel, the stop member is fixed to the connection channel, and at least one connection window is formed in a middle of the stop member and is connected to the connection channel, the low end of the guide rod is pressed against the stop member, wherein a mounting member is arranged in part of the connection channel, wherein a mounting chamber is formed downwards in a middle of the mounting member in an axial direction, the high end of the guide rod is slidably inserted into the mounting chamber, and the elastic member is arranged in the mounting chamber and is located between the mounting member and the high end of the guide rod, so that the guide rod tends to move downwards in an axial direction and is pressed against the stop member, the at least one wire mesh demister is mounted on the guide rod and a part thereof is located at the reduction part, at least one open window connected to the connection channel is formed in the middle of the mounting member.

7. A hydrogen production device, comprising:
　at least one liquid supply component, comprising an electrolytic cell and a liquid supply member that supplies an electrolyte to the electrolytic cell;
　at least one electrolysis component, for electrolysis of the electrolyte located in the electrolytic cell; and
　a gas-liquid separation apparatus, comprising:
　a tank, wherein an inlet is formed in a middle of the tank, a hydrogen outlet is formed in a top of the tank, and a processing chamber connected to the inlet and the hydrogen outlet is further formed in the tank; and
　a flow reducing component, wherein the flow reducing component is formed in the processing chamber and maintained above the inlet, the flow reducing component forms a flow reducing space and a flow partition chamber in a part of the processing chamber above the inlet, a gas-liquid initial separation space is formed in the processing chamber at a position below the flow reducing component, the flow reducing component forms at least one connection hole and a connection channel, the flow partition chamber is arranged to be connected to the flow reducing space through the at least one connection hole, the gas-liquid initial separation space is connected to the flow partition chamber through the connection channel, the flow reducing space is arranged to be connected to the hydrogen outlet, the flow reducing space and the flow partition chamber are coaxially formed in the processing chamber, the flow reducing component comprises a transverse partition wall and a partition cylinder, an edge of the transverse partition wall is sealably mounted on an inner wall of the tank, the partition cylinder has a vertical sidewall and a top sealing wall, the vertical sidewall extends towards the hydrogen outlet in the top, the top sealing wall is arranged to cover a top of the vertical sidewall, the flow reducing space is formed in an upper space between the vertical sidewall, the top sealing wall, the transverse partition wall, and the inner wall of the tank, for storing clear water, the connection hole is formed in a bottom of the vertical sidewall, the flow partition chamber is formed between the vertical sidewall and the top sealing wall of the partition cylinder and the transverse partition wall, the flow reducing component comprises a connection member, a bottom of the connection member is arranged in a middle of the transverse partition wall and extends towards the flow partition chamber, the connection channel is formed in a middle of the connection member, the connection member extends in a vertical direction, and a gas outlet is formed in an end of the connection member in the flow partition chamber, the inlet being connected to the electrolytic cell for separation of hydrogen mixed with a mist-like electrolyte formed after electrolysis, wherein the flow reducing space is arranged to be pre-filled with a predetermined amount of clear water, the connection hole is set to be submerged by the clear water, after the hydrogen mixed with the mist-like electrolyte that needs to be separated enters the processing chamber via the inlet, the hydrogen mixed with the mist-like electrolytet is directed to the gas-liquid initial separation space, so as to be preliminarily separated, and then the hydrogen mixed with the mist-like electrolytet flows upward through the connection channel and flows downwards into the flow partition chamber via the gas outlet of the connection member, a liquid level of the clear water in the flow reducing space increases while a water level of the clear water in the flow partition chamber decreases to expose the connection hole, the hydrogen mixed with the mist-like electrolyte enters the clear water located in the flow reducing space via the connection hole, so as to be washed in the flow reducing space, so that the electrolyte in the hydrogen mixed with the mist-like electrolyte is mixed into the clear water while the washed hydrogen is allowed to flow out of the hydrogen outlet.

8. An electrolyte and hydrogen separating method, performed by a gas-liquid separation apparatus, which comprises:
 a tank, wherein an inlet is formed in a middle of the tank, a hydrogen outlet is formed in a top of the tank, and a processing chamber connected to the inlet and the hydrogen outlet is further formed in the tank; and
 a flow reducing component, wherein the flow reducing component is formed in the processing chamber and maintained above the inlet, the flow reducing component forms a flow reducing space and a flow partition chamber in a part of the processing chamber above the inlet, a gas-liquid initial separation space is formed in the processing chamber at a position below the flow reducing component, the flow reducing component forms at least one connection hole and a connection channel, the flow partition chamber is arranged to be connected to the flow reducing space through the at least one connection hole, the gas-liquid initial separation space is connected to the flow partition chamber through the connection channel, the flow reducing space is arranged to be connected to the hydrogen outlet, the flow reducing space and the flow partition chamber are coaxially formed in the processing chamber, the flow reducing component comprises a transverse partition wall and a partition cylinder, an edge of the transverse partition wall is sealably mounted on an inner wall of the tank, the partition cylinder has a vertical sidewall and a top sealing wall, the vertical sidewall extends towards the hydrogen outlet in the top, the top sealing wall is arranged to cover a top of the vertical sidewall, the flow reducing space is formed in an upper space between the vertical sidewall, the top sealing wall, the transverse partition wall, and the inner wall of the tank, for storing clear water, the connection hole is formed in a bottom of the vertical sidewall, the flow partition chamber is formed between the vertical sidewall and the top sealing wall of the partition cylinder and the transverse partition wall, the flow reducing component comprises a connection member, a bottom of the connection member is arranged in a middle of the transverse partition wall and extends towards the flow partition chamber, the connection channel is formed in a middle of the connection member, the connection member extends in a vertical direction, and a gas outlet is formed in an end of the connection member in the flow partition chamber, comprising the following steps:
 introducing hydrogen mixed with a mist-like electrolyte into a processing chamber through an inlet; and
 counteracting part of a pressure of the hydrogen mixed with the mist-like electrolyte by clear water in a flow reducing space formed in a flow reducing component, to reduce a flow rate of the hydrogen mixed with the mist-like electrolyte flowing into the processing chamber, and washing an electrolyte in the hydrogen mixed with the mist-like electrolyte, wherein the flow reducing component is arranged in the processing chamber and above the inlet, wherein the flow reducing space is arranged to be pre-filled with a predetermined amount of clear water, the connection hole is set to be submerged by the clear water, after the hydrogen mixed with the mist-like electrolyte that needs to be separated enters the processing chamber via the inlet, the hydrogen mixed with the mist-like electrolytet is directed to the gas-liquid initial separation space, so as to be preliminarily separated, and then the hydrogen mixed with the mist-like electrolytet flows upward through the connection channel and flows downwards into the flow partition chamber via the gas outlet of the connection member, a liquid level of the clear water in the flow reducing space increases while a water level of the clear water in the flow partition chamber decreases to expose the connection hole, the hydrogen mixed with the mist-like electrolyte enters the clear water located in the flow reducing space via the connection hole, so as to be washed in the flow reducing space, so that the electrolyte in the hydrogen mixed with the mist-like electrolyte is mixed into the clear water while the washed hydrogen is allowed to flow out of the hydrogen outlet.

* * * * *